United States Patent
Hong

(10) Patent No.: US 9,430,247 B2
(45) Date of Patent: Aug. 30, 2016

(54) BOOT-UP METHOD OF E-FUSE, SEMICONDUCTOR DEVICE AND SEMICONDUCTOR SYSTEM INCLUDING THE SAME

(71) Applicant: SK hynix Inc., Gyeonggi-do (KR)

(72) Inventor: Yun-Seok Hong, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 257 days.

(21) Appl. No.: 14/106,816

(22) Filed: Dec. 15, 2013

(65) Prior Publication Data

US 2015/0019853 A1    Jan. 15, 2015

(30) Foreign Application Priority Data

Jul. 10, 2013    (KR) .................. 10-2013-0080915

(51) Int. Cl.
*G06F 9/44*    (2006.01)
*H04L 12/931*    (2013.01)

(52) U.S. Cl.
CPC ............. *G06F 9/4401* (2013.01); *H04L 49/40* (2013.01)

(58) Field of Classification Search
None
See application file for complete search history.

(56) References Cited

U.S. PATENT DOCUMENTS

2002/0120882 A1*  8/2002  Sarangi et al. ............ G06F 1/24
                                                          713/600
2008/0018381 A1*  1/2008  Shin ....................... G11C 5/145
                                                          327/536

FOREIGN PATENT DOCUMENTS

KR    1020050047911    5/2005
KR    1020070068851    7/2007

* cited by examiner

*Primary Examiner* — Kim Huynh
*Assistant Examiner* — Vincent Chang
(74) *Attorney, Agent, or Firm* — IP & T Group LLP

(57) ABSTRACT

A semiconductor device includes a power-up signal generation unit suitable for receiving a first power supply voltage and a second power supply voltage higher the first power supply voltage and generating a power-up signal when the first and second power supply voltage increase to reach target levels, respectively, a voltage level adjusting unit suitable for generating a third power supply voltage by adjusting a voltage level of the second power supply voltage, a boot-up signal generation unit suitable for generating a boot-up signal in response to the power-up signal, and a circuit operation unit suitable for performing a boot-up operation using the third power supply voltage in response to the boot-up signal.

16 Claims, 4 Drawing Sheets

US 9,430,247 B2

BOOT-UP METHOD OF E-FUSE, SEMICONDUCTOR DEVICE AND SEMICONDUCTOR SYSTEM INCLUDING THE SAME

CROSS-REFERENCE TO RELATED APPLICATIONS

The present application claims priority of Korean Patent Application No. 10-2013-0080915, filed on Jul. 10, 2013, which is incorporated herein by reference in its entirety.

BACKGROUND

1. Field

Exemplary embodiments of the present invention relate to a semiconductor design technology, and more particularly, to a method for performing a boot-up operation of an E-fuse, a semiconductor device and a semiconductor system including the same.

2. Description of the Related Art

In general, an electrically programmable fuse module, i.e., an array of E-fuses (hereinafter, an Array E-fuse), used in a semiconductor device performs a boot-up operation for reading fuse information before any other operations thereof. Herein, the fuse information may include address information used in a repair operation of a memory cell, or information defined by various test operations. In case of a conventional metal fuse, the fuse information is identified depending on whether a metal fuse is cut or not after a power-up operation. However, in case of an Array E-fuse, after the power-up operation, a boot-up operation is to be performed during a specific time.

For example, in case of a double data rate 3 (DDR3) of synchronous DRAM (SDRAM) a boot-up operation is performed during 500 µs after a power-up operation. However, in case of a low power DDR SDRAM (LPDDR), a boot-up operation is performed within 200 µs after a power-up operation.

However, in an electronic device using different levels of power supply voltages VDD1 and VDD2, an error may occur in a boot-up operation of an Array E-fuse.

More specifically, a boot-up activation signal for a boot-up operation may be generated and the boot-up operation may be performed, while the power-up operation is performed. For example, the boot-up operation may be performed at about 0.85 (V) of a first power supply voltage VDD1. That is, the boot-up operation may be performed before the power-up operation is sufficiently performed, and an error may occur.

SUMMARY

Exemplary embodiments of the present invention are directed to a method for performing a boot-up operation of an E-fuse, a semiconductor device and a semiconductor system including the same.

In accordance with an embodiment of the present invention, a semiconductor device includes a power-up signal generation unit suitable for receiving a first power supply voltage and a second power supply voltage higher the first power supply voltage and generating a power-up signal when the first and second power supply voltage increase to reach target levels, respectively, a voltage level adjusting unit suitable for generating a third power supply voltage by adjusting a voltage level of the second power supply voltage, a boot-up signal generation unit suitable for generating a boot-up signal in response to the power-up signal, and a circuit operation unit suitable for performing a boot-up operation using the third power supply voltage in response to the boot-up signal.

In accordance with another embodiment of the present invention, a semiconductor system includes a controller suitable for generating a control signal in response to a power-up signal and a pumping voltage detection signal, and the semiconductor device suitable for performing a boot-up operation in response to the control signal, wherein the power-up signal is generated when a power supply voltage increases to reach a target level.

In accordance with further embodiment of the present invention, a boot-up method of an E-fuse includes receiving a first power supply voltage and a second power supply voltage that is higher than the first power supply voltage, and generating a power-up signal by detecting the first and second power supply voltages, converting the second power supply voltage to a third power supply voltage of a set target voltage level, generating a boot-up signal in response to the power-up signal, and performing a boot-up operation using the third power supply voltage in response to the boot-up signal.

DETAILED DESCRIPTION

Figure 1:
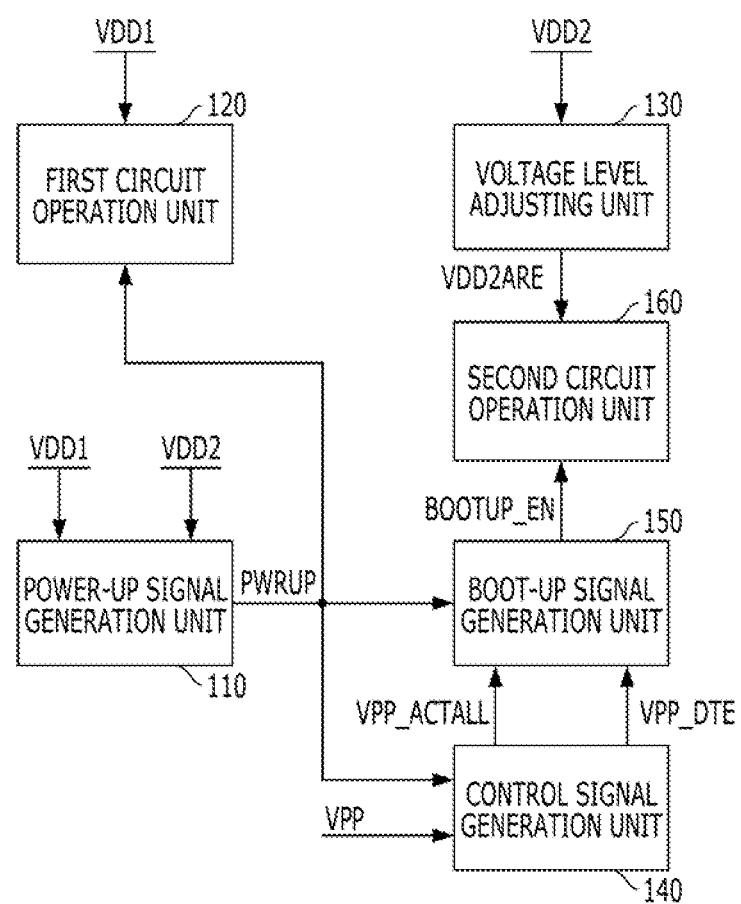
FIG. 1 is a block diagram illustrating a semiconductor device in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence.

FIG. 1 is a block diagram illustrating a semiconductor device in accordance with an embodiment of the present invention.

Referring to FIG. 1, a semiconductor device includes a power-up signal generation unit 110, a first circuit operation unit 120, a voltage level adjusting unit 130, a control signal generation unit 140, a boot-up signal generation unit 150, and a second circuit operation unit 160.

The power-up signal generation unit 110 receives a first power supply voltage VDD1 and a second power supply voltage VDD2, and generates a power-up signal PWRUP through a power-up operation. Herein, a target level of the second power supply voltage VDD2 is higher than a target level of the first power supply voltage VDD1.

For example, in case of using different levels of voltages such as the first power supply voltage VDD1 having 1.2V and the second power supply voltage VDD2 having 1.8V, the power-up signal generation unit 110 is inactivated when any of the first power supply voltage VDD1 and the second power supply voltage VDD2 does not reach its target voltage. When the first power supply voltage VDD1 and the second power supply voltage VDD2 reach a first target voltage level (0.8V) and a second target voltage (1.2V), respectively, the power-up signal PWRUP is generated. The power-up signal PWRUP is provided to the first circuit operation unit 120, the control signal generation unit 140, and the boot-up signal generation unit 150.

The first circuit operation unit 120 receives the first power supply voltage VDD1 as a driving voltage in response to the power-up signal PWRUP provided from the power-up signal generation unit 110.

The voltage level adjusting unit 130 receives the second power supply voltage VDD2, and generates a third power supply voltage VDD2ARE by adjusting the second power supply voltage VDD2. That is, in case of using two different levels of power supply voltages, the voltage level adjusting unit 130 may generate other levels of voltages by down-converting a high level voltage among the power supply voltages. Herein, the second power supply voltage VDD2 may be down-converted to a constant voltage level (1.2V) of the third power supply voltage VDD2ARE. That is, since a power-up trigger is started at 1.2V, a stable boot-up operation may be performed at this point.

The control signal generation unit 140 receives the power-up signal PWRUP and a pumping voltage VPP, and generates a control signal for controlling an activation time of a boot-up signal BOOTUP_EN in response to the power-up signal PWRUP and the pumping voltage VPP.

Herein, the control signal includes a first control signal VPP_ACTALL and a second control signal VPP_DTE. The first control signal VPP_ACTALL is generated in response to the power-up signal PWRUP and a pumping voltage detection signal VPPDTE. The second control signal VPP_DTE is generated by lowering a voltage level of the pumping voltage VPP by a predetermined voltage level (0.5V). The second control signal VPP_DTE and the pumping voltage detection signal VPPDTE have different voltage levels from each other.

That is, the first control signal VPP_ACTALL and the second control signal VPP_DTE are supplemented to generate stably the boot-up signal BOOTUP_EN. Herein, detailed descriptions of the first control signal VPP_ACTALL and the second control signal VPP_DTE will follow with reference to FIGS. 2 and 3 in later.

The boot-up signal generation unit 150 receives the power-up signal PWRUP, the first control signal VPP_ACTALL and the second control signal VPP_DTE, and generates the boot-up signal BOOTUP_EN in response to the power-up signal PWRUP, the first control signal VPP_ACTALL and the second control signal VPP_DTE. The detailed descriptions of the boot-up signal generation unit will follow with reference to FIG. 4.

The second circuit operation unit 160 is provided with the third power supply voltage VDD2ARE as a driving voltage in response to the boot-up signal BOOTUP_EN and performs a boot-up operation using the third power supply voltage VDD2RE.

Figure 2:
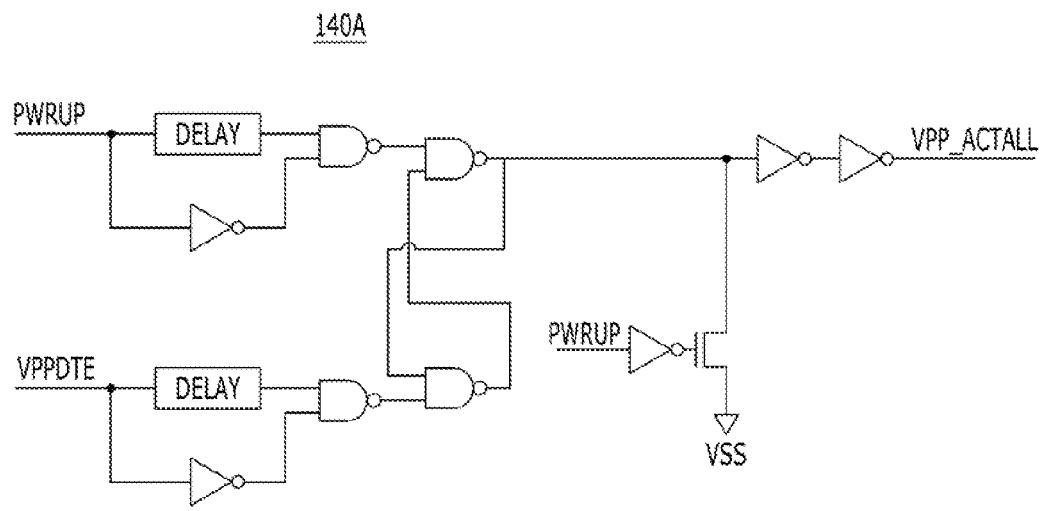
FIG. 2 is a circuit diagram illustrating a first control signal generator of a control signal generation unit shown in FIG. 1.

Herein, the second circuit operation may be an Array E-fuse,

FIG. 2 is a circuit diagram illustrating a first control signal generator of the control signal generation unit 140 shown in FIG. 1.

Referring to FIG. 2, the first control signal VPP_ACTALL may be generated in response to the power-up signal PWRUP and the pumping voltage detection signal VPP-DTE. The pumping voltage detection signal VPPDTE may be a signal, which is widely used in detecting a voltage level of the pumping voltage VPP. The detailed descriptions of the pumping voltage will follow with reference to FIG. 5 in later.

Hereinafter, a generation operation of the first control signal VPP_ACTALL will be described as below.

The power-up signal is generated when the power supply voltage VDD increases to reach its target level at initial operation. Since the pumping voltage VPP is generated using the power supply voltage VDD to be higher than its level, the pumping voltage VPP is lower than its target voltage right after the power-up signal is generated. Thus, the pumping voltage detection signal VPPDTE is inactivated in a high voltage. When the pumping voltage VPP becomes the target voltage level, the pumping voltage detection signal VPP is activated to a low voltage. The first control signal VPP_ACTALL may be generated when the pumping voltage detection signal VPPDTE is activated to the low voltage.

Figure 3:
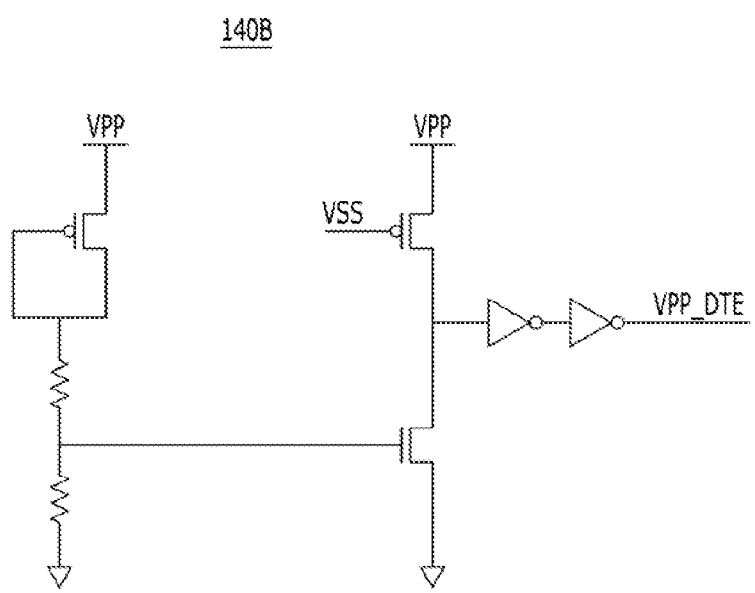
FIG. 3 is a circuit diagram illustrating a second control signal generator of the control signal generation unit shown in FIG. 1.

FIG. 3 is a circuit diagram illustrating a second control signal generator of the control signal generation unit 140 shown in FIG. 1.

Referring to FIG. 3, the second control signal VPP_DTE is supplemented to generate the boot-up signal BOOTUP_EN stably. That is, the second control signal VPP_DTE is generated by detecting a voltage level of the pumping voltage VPP and lowering the voltage level of the pumping voltage VPP by a predetermined voltage level (0.5V).

More specifically, the pumping voltage VPP is about 3V. If the voltage level of the pumping voltage VPP is directly detected, a detected signal as the second control signal VPP_DTE may not be outputted properly because of a process skew variation. Thus, the detected signal is generated by lowering the voltage level of the pumping voltage VPP by a predetermined voltage level (0.5V) and detecting the lowered voltage level, and it is used for generating the boot-up signal.

Figure 4:
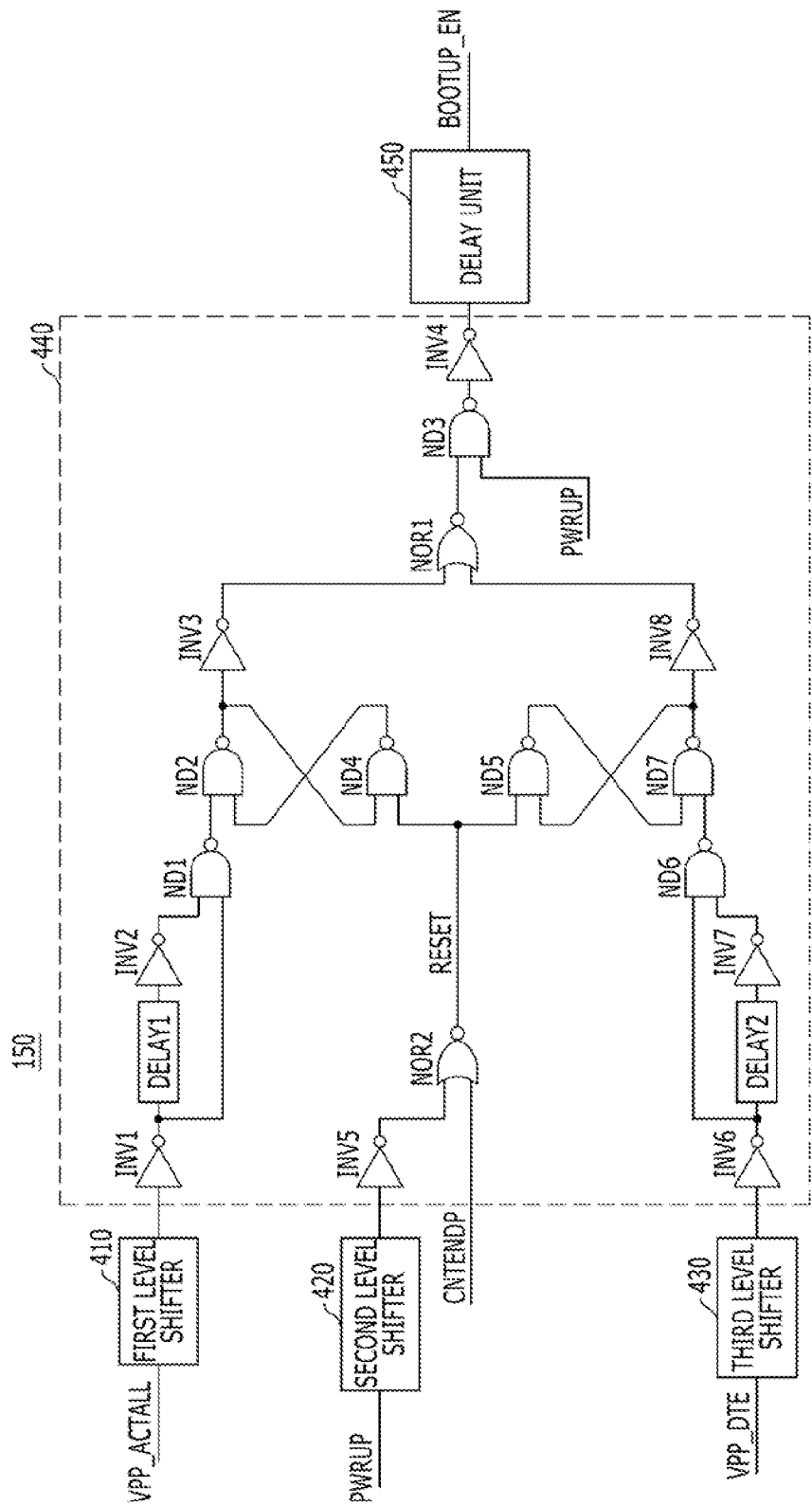
FIG. 4 is a circuit diagram illustrating a boot-up signal generation unit shown in FIG. 1.

FIG. 4 is a circuit diagrams illustrating the boot-up signal generation unit 150 shown in FIG. 1.

Referring to FIG. 4, the boot-up signal generation unit 150 includes first to third level shifters 410, 420 and 430, and a logic circuit 440.

The first level, shifter 410 receives the first control signal VPP_ACTALL and shifts the voltage level of the first control signal VPP_ACTALL to the third power supply voltage VDD2ARE level.

An output signal of the first level shifter 410 is inverted by a first inverter INV1. A first delay DELAY1 delays an output signal of the first inverter INV1. A second inverter INV2 inverts an output signal of the first delay DELAY1. A first NAND gate ND1 performs a NAND operation on an output signal of the second inverter INV2 and the output signal of the first inverter INV1. A second NAND gate ND2 performs a NAND operation on an output signal of the first NAND gate and a reset signal RESET inputted through a fourth NAND gate ND4. A third inverter INV3 inverts an output signal of the second NAND gate ND2. A first NOR gate NOR1 performs a NOR operation on an output signal of the third inverter INV3 and an output signal of an eighth inverter INV8. A third NAND gate ND3 performs a NAND operation on an output signal of the first NOR gate NOR1 and the power-up signal PWRUP. A fourth inverter INV4 inverts an output signal of the third NAND gate.

The second level shifter 420 receives the power-up signal PWRUP and shifts the voltage level of the power-up signal PWRUP to the third power supply voltage VDD2ARE level.

A fifth inverter INV5 inverts an output signal of the second level shifter 420. A second NOR gate NOR2 performs a NOR operation on an output signal of the fifth inverter INV5 and a boot-up end signal CNTENDP, and outputs the reset signal RESET to the fourth NAND gate ND4 and a fifth NAND gate ND5.

The third level shifter 430 receives the second control signal VPP_DTE and shifts the voltage level of the second control signal VPP_DTE to the third power supply voltage VDD2RE level.

An output signal of the third level shifter 430 is inverted by a sixth inverter INV6. A second delay DELAY2 delays an output signal of the sixth inverter INV6. A seventh inverter INV7 inverts an output signal of the second delay DELAY2. A sixth NAND gate ND6 performs a NAND operation on an output signal of the sixth inverter INV6 and an output signal of the seventh inverter INV7. A seventh NAND gate ND7 performs a NAND operation on an output of the sixth NAND gate and the reset signal RESET inputted through the fifth NAND gate ND5. The eighth inverter INV8 inverts an output signal of the seventh NAND gate ND7. The output signal of the eighth inverter INV8 is inputted to the first NOR gate NOR1.

The boot-up signal generation unit 150 may further include a delay unit 450, which delays an output signal of the fourth inverter INV4 by a predetermined time, e.g., 50 μs and outputs the boot-up signal BOOTUP_EN. That is, an internal voltage is stabilized by delaying the boot-up signal BOOTUP_EN by the predetermined time.

A delayed boot-up signal is inputted to the second circuit operation unit 160, and a boot-up operation is performed. When the boot-up operation is terminated, the boot-up end signal CNTENDP is activated.

Figure 5:
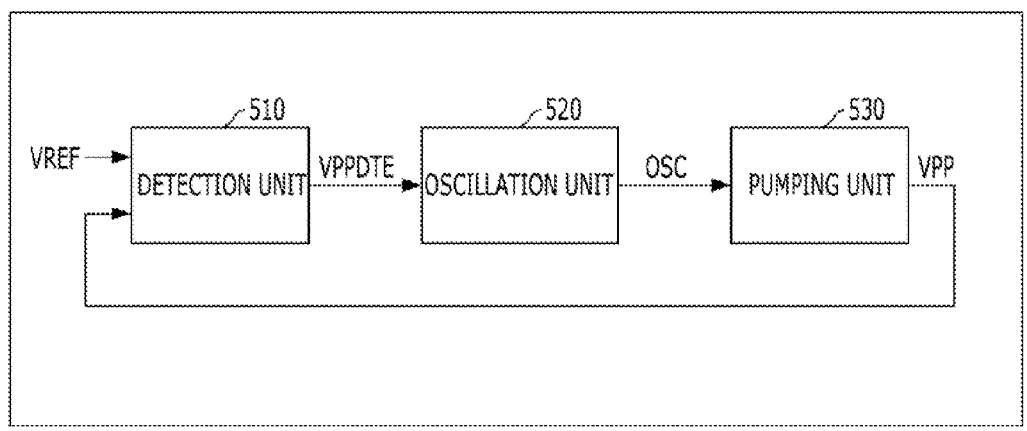
FIG. 5 is a block diagram illustrating a pumping voltage generation circuit for generating a pumping voltage in accordance with an embodiment of the present invention.

FIG. 5 is a block diagram illustrating a pumping voltage generation circuit for generating a pumping voltage in accordance with another embodiment of the present invention.

Referring to FIG. 5, a pumping voltage generation circuit includes a detection unit 510, an oscillation unit 520 and a pumping unit 530.

The detection unit 510 receives the pumping voltage VPP as feedback and detects a voltage level of the pumping voltage VPP based on a reference voltage VREF. The pumping voltage detection signal VPPDTE outputted from the detection unit 510 may be the pumping voltage detection signal VPPDTE used in generating the first control signal VPP_ACTALL shown in FIG. 2.

The oscillation unit 520 receives the pumping voltage detection signal VPPDTE and a periodic signal DSC.

The pumping unit 530 receives the periodic signal OSC and outputs the pumping voltage VPP in response to the periodic signal OSC outputted from the oscillation unit 520. The pumping voltage VPP may be the pumping voltage VPP used in generating the second control signal VPP_DTE shown in FIG. 3.

In case that the voltage level of the pumping voltage detection signal VPPDTE outputted from the detection unit 510 is sufficiently high, the pumping operation is stopped. In case that the voltage level of the pumping voltage detection signal VPPDTE outputted from the detection unit 510 is a low level, the pumping operation is performed at the pumping unit 530.

Figure 6:
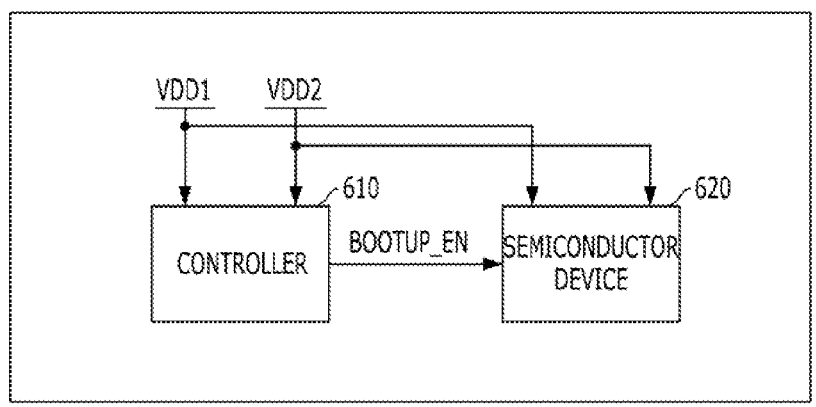
FIG. 6 is a block diagram illustrating a semiconductor system in accordance with an embodiment of the present invention.

FIG. 6 is a block diagram illustrating a semiconductor system in accordance with another embodiment of the present invention.

Referring to FIG. 6, a semiconductor system includes a controller 610 and a semiconductor device 620.

The controller 610 generates a boot-up signal BOOT_EN for performing a boot-up operation of the semiconductor device 620 in response to a power-up signal and a pumping voltage detection signal. The boot-up signal BOOTUP_EN is delayed and outputted to stabilize an internal voltage by a predetermined time, e.g., 50 μs.

The semiconductor device 620 performs the boot-up operation in response to the boot-up signal BOOTUP_EN outputted from the controller 610.

Herein, both of the controller 610 and the semiconductor device 620 receive and share a first power supply voltage VDD1 and a second power supply voltage VDD. Herein, the second power supply voltage VDD2 has a target level higher than the first power supply voltage VDD2.

The semiconductor device 620 receives the second power supply voltage VDD2, and generates a third power supply voltage by adjusting a voltage level of the second power supply voltage VDD2. The semiconductor device 620 may perform the boot-up operation in response to the boot-up signal BOOTUP_EN using the third power supply voltage as a power supply voltage. Herein, the semiconductor device may be an Array E-fuse.

Meanwhile, the controller 610 shown in FIG. 6 may include the boot-up signal generation unit 150 shown in FIG. 1. The semiconductor device 620 shown in FIG. 6 may include the voltage level adjusting unit 130 and the second circuit operation unit 160 shown in FIG. 1.

As described above, in embodiments of the present invention, a high power supply voltage such as a second power supply voltage VDD2 among the two different levels of voltages VDD1 and VDD2 may be down-converted and be used in an Array E-fuse. Thus, the reliability of data stored in Array E-fuse is increased by implementing a stable boot-up operation.

While the present invention has been described with respect to the specific embodiments, it will be apparent to those skilled in the art that various changes and modifications may be made without departing from the spirit and scope of the invention as defined in the following claims.

What is claimed is:

1. A semiconductor device, comprising:
    a power-up signal generation unit configured to receive a first power supply voltage and a second power supply voltage higher the first power supply voltage and generate a power-up signal when the first and second power supply voltage increase to reach target levels, respectively;
    a voltage level adjusting unit configured to receive the second power power voltage from the power-up signal generation unit and generate a third power supply voltage by adjusting a voltage level of the second power supply voltage;

a boot-up signal generation unit configured to receive the power-up signal from the power-up signal generation unit and generate a boot-up signal in response to the power-up signal; and a circuit operation unit configured to receive the boot-up signal from the boot-up signal generation unit and the third power supply voltage from the voltage level adjusting unit, and perform a boot-up operation using the third power supply voltage in response to the boot-up signal.

2. The semiconductor device of claim 1, wherein the circuit operation unit includes an electrically programmable fuse module and the boot-up operation includes a read operation of fuse information stored therein.

3. The semiconductor device of claim 1, further comprising:

a control signal generation unit generates a first control signal and a second control signal for controlling an activation time of the boot-up signal in response to the power-up signal and a pumping voltage.

4. The semiconductor device of claim 3, wherein the boot-up signal generation unit comprises:

a level shifter configured to shift voltage levels of the power-up signal, the first control signal and the second control signal to a voltage level of the third power supply voltage; and a logic circuit configured to generate the boot-up signal in response to an output signal of the level shifter.

5. The semiconductor device of claim 4, wherein the boot-up signal generation unit further includes a delay unit configured to delay an output signal of the logic circuit by a set time and output the boot-up signal.

6. The semiconductor device of claim 3, wherein the control signal generation unit is configured to generate the first control signal in response to the power-up signal and a pumping voltage detection signal and generate the second control signal by detecting a voltage lowered from the pumping voltage by a set voltage level.

7. The semiconductor device of claim 1, further comprising:

a first circuit operation unit configured to receive the first power supply voltage as a power supply voltage in response to the power-up signal.

8. A semiconductor system, comprising:

a controller suitable for generating a control signal for controlling an activation time of a boot-up signal in response to a power-up signal and a pumping voltage detection signal, wherein the boot-up signal is generated in response to the power-up signal; and the semiconductor device suitable for receiving the control signal from the controller and performing a boot-up operation in response to the control signal, wherein the power-up signal is generated when a power supply voltage increases to reach a target level, wherein each of the controller and the semiconductor receive a first power supply voltage and a second power supply voltage, and the semiconductor generates a third power supply voltage by adjusting a voltage level of the second power supply voltage, and performs the boot-up operation in response to the control signal using the third power supply voltage as the power supply voltage.

9. The semiconductor system of claim 8, wherein the power supply voltage includes a first power supply voltage and a second power supply voltage corresponding to a pumping voltage and higher than the first power supply voltage, and the controller and the semiconductor device share a first common power line and a second common power line, which receive the first and second power supply voltages, respectively.

10. The semiconductor system of claim 9, wherein the semiconductor device comprises:

a voltage level adjusting unit suitable for generating a third power supply voltage by adjusting a voltage level of the second power supply voltage; and a circuit operation unit suitable for performing the boot-up operation using the third power supply voltage in response to the control signal.

11. The semiconductor system of claim 9, wherein the pumping voltage detection signal is activated based on a voltage level of the pumping voltage.

12. The semiconductor system of claim 7, wherein the control signal is delayed by a set time and outputted from the controller to stabilize an internal voltage of the semiconductor device.

13. A boot-up method of an E-fuse, comprising:

receiving, with a power-up signal generation unit, a first power supply voltage and a second power supply voltage that is higher than the first power supply voltage, and generating, with the power-up signal generation unit, a power-up signal by detecting the first and second power supply voltages;

generating, with a voltage level adjusting unit, a third power supply voltage by adjusting a voltage level of the second power supply voltage;

receiving, with the boot-up signal generation unit, the power-up signal;

generating, with the boot-up signal generation unit, a boot-up signal in response to the power-up signal;

receiving, with a circuit operation unit, the boot-up signal and the third power supply voltage; and performing, with the circuit operation unit a boot-up operation using the third power supply voltage in response to the boot-up signal.

14. The boot-up method of claim 13, further comprising:

generating, with a control signal generation unit, a control signal in response to the power-up signal and a pumping voltage to control an activation time of the boot-up signal.

15. The boot-up method of claim 14, wherein the generating of the boot-up signal comprises:

shifting, with a level shifter, voltage levels of the power-up signal and the control signal to the set target voltage level of the third power supply voltage; and generating, with a logic circuit, the boot-up signal in response to shifted signals.

16. The boot-up method of claim 15, wherein the generating of the boot-up signal further comprises:

delaying, with a delay unit, the boot-up signal by a set time.

* * * * *